2,898,349
PROCESS FOR THE MANUFACTURE OF REACTION PRODUCTS OF EPICHLORHYDRIN AND POLYHYDRIC ALCOHOLS

Paul Zuppinger, Binningen, Walter Hofmann, Basel, and Willi Fisch, Binningen, Switzerland, assignors to Ciba Limited, Basel, Switzerland, a Swiss firm
No Drawing. Application March 17, 1954
Serial No. 416,954
Claims priority, application Switzerland March 25, 1953
2 Claims. (Cl. 260—348.6)

Reaction products of epichlorhydrin and polyhydric alcohols, which products consist substantially of polyethers contining glycidyl ether groups, have been known for some time. However, hitherto only a 2-stage process has been described for making them. By this process epichlorhydrin and a polyhydric aliphatic alcohol have been converted in a first stage into the corresponding chlorhydrin ether in the presence of a catalyst such as, more especially, sulfuric acid or a catalyst of the Friedel-Crafts type, for example, boron fluoride. The resulting chlorhydrin ether is then converted into the corresponding glycidyl ether in a second stage by treatment with an agent of alkaline reaction. This conversion is so sensitive to alkalies that a warning has been given against the use of agents of strongly alkaline reaction.

This invention provides a process for the manufacture of reaction products which consist substantially of a polyether containing at least one glycidyl ether group, in which the reaction of epichlorhydrin with a polyhydric alcohol is carried out in a single stage. The process is characterized in that an organic compound which, apart from 2–4 alcoholic hydroxyl groups, contains no other groups capable of reacting with epoxy groups, is reacted with more than ½ mol and advantageously more than 2 mol of epichlorhydrin per hydroxyl equivalent of the organic compound in the presence of a strong alkali in a single stage. This process has the advantage that it is carried out in a single stage, and that the use and subsequent removal of an acid catalyst are dispensed with. In view of the prior art referred to above it is surprising that it should be possible to make in good yield aliphatic polyethers containing glycidyl ether groups by the process of this invention in the presence of a strong alkali. Furthermore, the present single stage process is distinguished by the fact that the end products obtained thereby generally contain a considerably lower chlorine content than the products obtainable by the 2-stage process.

As organic compounds containing 2–4 alcoholic hydroxyl groups and being free from groups capable of reacting with epoxy groups, there come into consideration aliphatic compounds containing 2–4 alcoholic hydroxyl groups, for instance dihydric, trihydric and tetrahydric aliphatic alcohols, such as ethylene glycol, propane-diols, butane-diols and like diols derived from aliphatic hydrocarbons, glycerine, trimethylol-propane, hexanetriols, penta-erythritol, ether alcohols such as diethylene glycol, triethylene glycol, thiodioglycol, diglycerine ether or monoalkyl glycerine ethers, and also cyclo-aliphatic or aromatic compounds containing 2–4 alcoholic hydroxyl groups such as 1:4-dihydroxy-cyclohexane, 4:4'-dihydroxy-dicyclohexyl-dimethylmethane, dimethylol benzenes, 4:4'-dimethylol-diphenyl, monoarylglycerine ethers, diglycol ethers of aromatic diphenols, for example of hydroquinone, resorcinol, 4:4'-dihydroxydiphenyl-dimethylmethane or 4:4'-dihydroxy-diphenyl sulfone.

The compounds containing 2–4 alcoholic hydroxyl groups, the water-soluble compounds thereof being preferred, may be used alone for the reaction with epichlorhydrin or in the form of mixtures of these compounds. It is of advantage to use compounds containing two alcoholic hydroxyl groups. When compounds containing more than two alcoholic hydroxyl groups are used there is a possibility that besides soluble also insoluble constituents may be formed. The same is true of compounds containing two alcoholic hydroxyl groups which, as for example, in the case of decamethylene glycol, are separated from one another by a long carbon chain and are sparingly soluble in water. For carrying out the process there also come into consideration mixtures of compounds containing two alcoholic hydroxyl groups with those which contain more than 4 alcoholic hydroxyl groups.

The epichlorhydrin used for the reaction in the present process may be wholly or partially replaced by dichlorhydrin, which is intremediately converted, under the conditions of the process and by a corresponding addition of alkali, into epichlorhydrin which reacts with the alcoholic compound.

As a strong alkali, in the presence of which the reaction of epichlorhydrin with the polyhydric alcohol is carried out, there may be used with advantage sodium hydroxide or potassium hydroxide. The latter may be used either in the form of a solution or in the solid state, for example, a pulverized state. In many cases concentrated aqueous solutions are of advantage. However, there may also be used solutions in other solvents, for example, methyl alcohol or a mixture of the latter with water. Alkaline earth metal hydroxides for example barium hydroxide, may also be used as alkalies, but they are generally less useful. When the reaction is carried out in a substantially anhydrous medium, there may be used instead of alkali metal hydroxides, alkali metal carbonates, for example, sodium carbonate or potassium carbonate. Furthermore, there also come into consideration alkali metal alcoholates, for example, sodium methylate.

The reaction conditions may be varied to a considerable extent with regard to the relative proportions of the polyhydric alcoholic compound and epichlorhydrin, and with regard to the reaction temperature and the manner in which the reaction components are brought together. There are advantageously used 1–3 mols of epichlorhydrin per hydroxyl equivalent of the polyhydric alcohol used, and any unreacted epichlorhydrin may be recovered. The ratio of epichlorhydrin to hydroxyl equivalent may be lower or higher, but the proportion of epichlorhydrin must always be more than ½ mol for each hydroxyl equivalent.

The reaction temperature may vary within wide limits, but is advantageously within the range from room temperature to the boiling temperature of the reaction mixture. When using alkalies which produce a strong exothermic reaction, for example when using pulverized sodium hydroxide, in order to regulate the reaction it is of advantage to provide for sufficient external cooling at least at the beginning of the reaction.

An advantageous form of the process consists in continuously adding the strong alkali to the mixture of the polyhydric alcohol and epichlorhydrin at the rate at which the alkali is consumed, and also continuously removing, for example, by distillation, if desired, under reduced pressure, water formed by the reaction and any solvent used to dissolve the strong alkali, while returning to the reaction mixture any epichlorhydrin that distils over.

A mixture of polyvalent alcohol and epichlorhydrin and containing the whole quantity of alkali can be reacted. The reaction can however be carried out in such a way that the epichlorhydrin or the polyvalent alcohol is put into the reaction vessel and the remaining reaction partners are added to the reaction vessel either singly or in admixture continously or in portions in the course of the reaction. It is also possible to prepare a mixture of epichlorhydrin and alkali in the reaction vessel and to add the polyvalent alcohol during the reaction.

In the reaction of the present process there are always obtained mixtures of reaction products which consist substantially of polyethers containing at least one glycidyl group. Depending on the purity of the starting compounds, the products obtained are colorless to yellowish in color. The content of glycidyl ether groups is dependent on the conditions of the process, and especially on the molecular ratio of the epichlorhydrin to the hydroxyl equivalent of the polyhydric alcohol. In general it has been found that the higher this molecular ratio the greater is the content of glycidyl ether groups in the product. No precise constitution can be ascribed to the reaction products of this process. The polyether mixtures are therefore advantageously characterized by their content of glycidyl groups ("epoxy-equivalents per kilogram"), by their content of hydroxyl groups ("hydroxyl-equivalents per kilogram"), and also by their chlorine content determined by hydrolysis and by combustion analysis ("chlorine equivalent per kilogram"). With respect to these determinations, there are hereinafter used the following abbreviations: "ep.-eq.," "OH-eq.," "Cl-eq. (by hydrolysis)" and "Cl-eq. (by combustion) per kg."

The products are generally of lower viscosity and less colored than the polyglycidyl ethers obtained from compounds containing phenolic hydroxyl groups. They can be used in known manner in the plastics industry, for example, for casting or adhesive purposes, and as modifying agents for reducing the viscosity of other epoxide and like resins.

The following examples illustrate the invention, the parts and percentages being by weight unless otherwise stated:

Example 1

In a flask fitted with stirring mechanism 62 parts (1 mol) of pure ethylene glycol and 370 parts (4 mols) of pure epichlorhydrin are heated at the boil. The ratio of hydroxyl-equivalent to epichlorhydrin is therefore 1:2. The flask is fitted with a thermometer, dropping funnel and a descending condenser, which opens into a separator for separating epichlorhydrin and water, and is also provided with a return tube for the epichlorhydrin. The mixture is brought to the boil in the flask in an oil bath. 160 parts of an aqueous solution of caustic soda of 50 percent strength are then introduced dropwise in the course of 3½ hours, during which sodium chloride precipitates out. The temperature of the reaction mixture is 100–115° C. The mixture of epichlorhydrin and water that distils off is separated in the separator and the epichlorhydrin is continuously returned to the flask. After a further hour 113 parts of water will have been separated and the distillate is free from water. The contents of the flask are cooled, filtered, and the salt is washed with 130 parts of epichlorhydrin in three portions. The filtrate, combined with the epichlorhydrin washings, is distilled to remove the solvent on a boiling water bath under reduced pressure produced with a water jet, and 176 parts of a practically colorless water soluble residue, which is liquid at ordinary temperature, remain behind. This product has a content of 6.01 ep.-eq., 3.50 OH-eq., 0.10 Cl-eq. (by hydrolysis) and 0.54 Cl-eq. (by combustion) per kg.

Example 2

The procedure is the same as in Example 1, except that the reaction is carried out with commercial starting materials and the caustic soda solution is introduced dropwise in the course of 80 minutes. There are obtained 177 parts of a pale yellow product having a content of 5.85 ep.-eq., 3.70 OH-eq. and 0.25 Cl-eq. (by hydrolysis) and 0.42 Cl-eq. (by combustion) per kg.

If the condensation is carried out under a reduced pressure of 300–400 mm. of mercury, an external bath temperature of 100° C. suffices to maintain the reaction mixture continuously at the boil. There are then obtained 165 parts of a product having a content of 4.88 ep.-eq., 4.64 OH-eq. and 0.33 Cl-eq. (by hydrolysis) and 0.36 Cl-eq. (by combustion) per kg.

In the following table are given the conditions used and results obtained when the procedure described in Example 1 is repeated with different ratios of hydroxyl equivalent to epichlorhydrin.

| Ratio of hydroxyl-equivalent to epichlorhydrin | 1:1 | 1:1.25 | 1:1.5 | 1:3 | 1:5 |
|---|---|---|---|---|---|
| Parts of: | | | | | |
| ethylene glycol | 62 | 62 | 62 | 62 | 62 |
| epichlorhydrin | 185 | 230 | 278 | 556 | 925 |
| NaOH 50% strength | 160 | 160 | 160 | 160 | 160 |
| Period of addition of alkali in minutes | 55 | 45 | 40 | 55 | 90 |
| Yield in parts of final product | 114 | 156 | 189 | 174 | 172 |
| Content of final product in equivalents, per kilogram, of: | | | | | |
| epoxide | 2.30 | 3.70 | 5.0 | 5.80 | 5.70 |
| hydroxyl | 5.50 | 5.80 | 3.90 | 3.25 | 4.18 |
| chlorine (by hydrolysis) | 1.26 | 0.51 | 0.25 | 0.20 | 0.34 |
| chlorine (by combustion) | 1.80 | 0.64 | 0.65 | 0.58 | 0.50 |

Example 3

62 parts (1 mol) of ethylene glycol and 370 parts (4 mols) of epichlorhydrin are placed in a stirring flask fitted with a thermometer and a reflux condenser. The ratio of hydroxyl-equivalent to epichlorhydrin is 1:2. 80 parts of pulverized sodium hydroxide are added in portions while cooling with ice in the course of 5 minutes. The ice cooling means is then removed, and replaced by a water bath at room temperature. After the mixture has been stirred for 100 hours at room temperature, the magma-like mass is stirred for a further 1½ hours at 50° C. and 40 minutes at 80° C. 60 parts of epichlorhydrin are then added, the reflux condenser is replaced by a descending condenser and the mixture is distilled by means of oil heating until the temperature of the reaction mixture is 115° C. After being cooled, the contents of the flask are in the form of a sludge, and are extracted a few times with chloroform by decantation. The combined decanted solutions are distilled to remove the solvent, and leave behind 116 parts of a yellow liquid product having a content of 3.60 ep.-eq., 5.55 OH-eq., 1.31 Cl-eq. (by hydrolysis) and 1.40 Cl-eq. (by combustion), per kg.

Example 4

(a) 62 parts (1 mol) of ethylene glycol and 555 parts (6 mols) of epichlorhydrin are heated at 60° C. in a stirring flask fitted with a thermometer, reflux condenser and charging connection. The ratio of hydroxyl-equivalent to epichlorhydrin is 1:3. 80 parts of pulverized sodium hydroxide are then added in 7 portions in the course of 1¾ hours. As the reaction is exothermic the temperature of the mixture is maintained at 60–70° C. by external cooling. The mixture is then distilled in an oil bath (120° C.) and under an increasing vacuum. There are obtained 405 parts of epichlorhydrin. The residue in the flask is taken up with monochlorobenzene, the mixture is filtered with suction and the filter residue is washed with monochlorobenzene. The filtrate is evaporated on the water bath under reduced pressure produced by a water jet. There remain behind 172 parts of a yellow liquid product having a content of 5.12 ep.-eq., 4.06 OH-eq. and 0.17 Cl-eq. (by hydrolysis) and 0.34 Cl-eq. (by combustion) per kg.

(b) Procedure is according to the method described in Example (a) above with the difference that 370 parts (4 mols) of epichlorhydrin are used, and instead of the sodium hydroxide 108 parts of powdery sodium methylate are added in 19 portions in the course of 70 minutes, and that the residue in the flask is taken up with chloroform (instead of monochlorobenzene), and the residue on the filter is washed with chloroform. The proportion of hydroxyl equivalent to epichlorhydrin is in this case 1:2. There are obtained 156 parts of a clear, yellowish product which is liquid at room temperature with a content of 5.23 ep.-eq., 3.20 OH-eq., 0.19 Cl-eq. (by hydrolysis) and 0.30 Cl-eq. (by combustion) per kg.

Example 5

The procedure is the same as that described in Example 1, except that the aqueous caustic soda solution is replaced by a solution of 80 parts of sodium hydroxide in 80 parts of water and 40 parts of methanol, and the solution is introduced dropwise into the reaction mixture in the course of 1¾ hours. The distilling mixture of epichlorhydrin, water and methanol is continuously replaced by fresh epichlorhydrin. In this manner there are obtained 135 parts of a liquid final product having a content of 5.43 ep.-eq., 3.39 OH-eq., 0.08 Cl-eq. (by hydrolysis) and 0.15 Cl-eq. (by combustion), per kg.

Example 6

The procedure is the same as that described in Example 1 except that the aqueous caustic soda solution is replaced by 80 parts of pulverized sodium hydroxide which is added in small portions to the reaction mixture in the course of 40 minutes. In this manner there are obtained 155 parts of a liquid final product having a content of 5.72 ep.-eq., 3.96 OH-eq., 0.06 Cl-eq. (by hydrolysis) and 0.26 Cl-eq. (by combustion), per kg.

By working under the same conditions, but without the continuous removal of the water formed in the reaction, there is obtained a product having a content of 5.0 ep.-eq., 4.8 OH-eq. and 0.3 Cl-eq. (by hydrolysis) and 0.55 Cl-eq. (by combustion), per kg.

Example 7

The procedure is the same as that described in Example 6, except that the sodium hydroxide is replaced by 315 parts of barium hydroxide, Ba(OH)$_2$.8H$_2$O, which is added in small portions to the reaction mixture in the course of 2 hours. The resulting thick magma is then diluted with 200 parts of epichlorhydrin by further heating. After further heating for 4 hours, 135 parts of water will have separated, the mixture is then cooled, filtered by suction and worked up as described in Example 1. There are obtained 110 parts of a viscous final product having a content of 1.58 ep.-eq., 6.90 OH-eq., 1.80 Cl-eq (by hydrolysis) and 3.50 Cl-eq. (by combustion) per kg.

Example 8

62 parts (1 mol) of ethylene glycol, 370 parts (4 mols) of epichlorhydrin and 106 parts of anhydrous sodium carbonate are boiled for 27 hours in a stirring flask fitted with a thermometer and a reflux condenser. The temperature of the reaction mixture rises from 100° C. to 138° C. The ratio of hydroxyl-equivalent to epichlorhydrin is 1:2. The contents of the flask are then cooled, filtered with suction and further worked up as described in Example 1. There are obtained 249 parts of a yellow liquid product having a content of 1.20 ep.-eq., 4.40 OH-eq., 2.30 Cl-eq. (by hydrolysis) and 2.45 Cl-eq. (by combustion), per kg.

By using 138 parts, instead of 106 parts of sodium carbonate, and boiling the mixture for 48 hours, the temperature of the contents of the flask rise only to 120° C. There are obtained 272 parts of a yellow liquid product having a content of 2.46 ep.-eq., 7.78 OH-eq., 0.84 Cl-eq. (by hydrolysis) and 2.35 Cl-eq. (by combustion), per kg.

By boiling the mixture for 48 hours as described above, but while continuously distilling off the water formed in the reaction as described in Example 1, the final product obtained by using 106 parts of sodium carbonate has a content of 4.71 ep.-eq., 4.44 OH-eq., 0.32 Cl-eq., (by hydrolysis) and 0.97 Cl-eq. (by combustion) per kg., and by using 138 parts of sodium carbonate the final product has a content of 4.93 ep.-eq., 6.49 OH-eq., 0.23 Cl-eq. (by hydrolysis) and 0.79 Cl-eq. (by combustion) per kg.

Example 9

By the procedure described in Example 1, 155 parts of caustic soda solution of 50 percent strength are introduced dropwise in the course of 110 minutes into 31 parts (½ mol) of ethylene glycol, 87 parts (½ mol) of 1:10 decane-diol and 370 parts (4 mols) of epichlorhydrin. The ratio of hydroxyl-equivalent to epichlorhydrin is 1:2. There are obtained 207 parts of a yellow final product which is liquid above 30° C. and has a content of 4.52 ep.-eq., 3.78 OH-eq., 0.14 Cl-eq. (by hydrolysis) and 0.23 Cl-eq. (by combustion), per kg.

By using instead of ethylene glycol, 75 parts (½ mol) of triethylene glycol, there are obtained in an analogous manner 259 parts of a yellow final product which is liquid above 30° C. and has a content of 4.50 ep.-eq., 3.32 OH-eq., 0.12 Cl-eq. (by hydrolysis) and 0.23 Cl-eq. (by combustion), per kg.

Example 10

The procedure is the same as that described in Example 1, except that, instead of ethylene glycol, there are used other compounds containing 2–3 alcoholic hydroxyl groups. These compounds and the conditions, and yields and properties of the reaction products obtained are given in the following table:

| Compound | 1:2-pro-panediol | 1:3-pro-panediol | 1:3-bu-tanediol | 2:4-pen-tanediol-2-methyl | di-ethylene-glycol | glycerine |
|---|---|---|---|---|---|---|
| Ratio of hydroxyl equivalent to epichlorhydrin | 1:2 | 1:2 | 1:2 | 1:2 | 1:2 | 1:2 |
| Parts of: | | | | | | |
| Polyalcohol | 76 | 76 | 90 | 118 | 106 | 92 |
| epichlorhydrin | 370 | 370 | 370 | 370 | 370 | 555 |
| NaOH of 50% strength | 160 | 160 | 160 | 160 | 160 | 240 |
| Period of addition of alkali in minutes | 50 | 26 | 60 | 40 | 20 | 150 |
| Yield in parts of final product | 199 | 195 | 206 | 165 | 231 | 108 |
| Content of final product in equivalents, per kilogram, of: | | | | | | |
| epoxide | 5.55 | 5.90 | 5.37 | 4.27 | 5.22 | 4.75 |
| hydroxyl | 4.30 | 5.10 | 5.75 | 3.24 | 4.24 | 3.82 |
| chlorine (by hydrolysis) | 0.12 | 0.32 | 0.12 | 0.18 | 0.20 | 0.43 |
| chlorine (by combustion) | 0.45 | 0.59 | 0.41 | 0.55 | 0.57 | 0.71 |

Example 11

370 parts (4 mols) of epichlorhydrin are heated to 70° C. in a stirring flask fitted with a thermometer, reflux condenser and charging connection. There are then added within 30 minutes 10 portions of 10.6 parts (total 1 mol) of diglycol and 10 portions of 8 parts of pulverized sodium hydroxide. The ratio of hydroxyl-equivalent to epichlorhydrin is 1:2. The temperature is maintained at 68-75° C. by external cooling, after a further condensation period of 15 minutes the mixture is worked up as described in Example 4. There are obtained 216 parts of a liquid yellow water-soluble product having a content of 5.25 ep.-eq., 4.0 OH-eq., 0.25 Cl-eq. (by hydrolysis) and 0.33 Cl-eq. (by combustion), per kg.

If, under conditions which are otherwise the same, the diglycol is added dropwise to a mixture of the epichlorhydrin and pulverized sodium hydroxide, there are obtained 218 parts of a product having a content of 5.05 ep.-eq., 3.80 OH-eq., 0.38 Cl-eq. (by hydrolysis) and 0.41 Cl-eq. (by combustion), per kg.

*Example 12*

168 parts (1 mol) of phenyl glycerine ether and 370 parts (4 mols) of epichlorhydrin are mixed as described in Example 4 with 80 parts of pulverized sodium hydroxide which are added in portions in the course of 35 minutes. The ratio of hydroxyl-equivalent to epichlorhydrin is 1:2. There are obtained 256 parts of a yellow liquid product having a content of 3.20 ep.-eq., 2.90 OH-eq., 0.25 Cl-eq. (by hydrolysis) and 0.30 Cl-eq. (by combustion), per kg. By using, instead of phenyl glycerine ether, 318 parts (1 mol) of the diglycol ether of dihydroxydiphenyl-dimethylmethane of the formula.

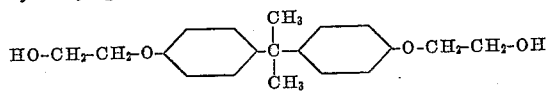

there are obtained 360 parts of a yellow oily product having a content of 3.27 ep.-eq., 1.14 OH-eq., 0.47 Cl-eq. (by hydrolysis) and 1.00 Cl-eq. (by combustion), per kg.

By using instead of the phenyl glycerine ether, 122 parts (1 mol) of thiodiglycol there is obtained by the same procedure the product having a content of 1.43 ep.-eq., 5.39 OH-eq., 2.09 Cl-eq. (by hydrolysis), per kg.

*Example 13*

By the procedure described in Example 1, 480 parts of caustic soda solution of 50 percent strength are introduced dropwise in the course of 3 hours into 62 parts (1 mol) of ethylene glycol and 516 parts (4 mols) of dichlorhydrin. After working up, there are obtained 179 parts of a yellow liquid product having a content of 2.18 ep.-eq., 8.29 OH-eq., 1.40 Cl-eq. (by hydrolysis) and 1.67 Cl-eq. (by combustion), per kg.

*Example 14*

(a) In accordance with the directions given in Example 1, 320 parts of caustic soda solution of 50 percent strength are added dropwise to 62 parts (1 mol) of ethylene glycol, 62 parts (⅔ mol) of glycerine and 1110 parts (12 mols) of epichlorhydrin in the course of 110 minutes. The proportion of hydroxyl equivalent to epichlorhydrin is 1:3. There are obtained 334 parts of a yellow end product which is liquid at room temperature and has a content of 5.53 ep.-eq., 4.26 OH-eq., 0.37 Cl-eq. (by hydrolysis) and 0.48 Cl-eq. (by combustion), per kg.

(b) When in the above Example (a) the 62 parts of glycerine are replaced by 68 parts (½ mol) of pentaerythrite and then 320 parts of caustic soda solution of 50 percent strength are added to the reaction mass in the course of 145 minutes, there are obtained 274 parts of a yellow end product which is liquid at room temperature and has a content of 5.60 ep.-eq., 3.78 OH-eq., 0.26 Cl-eq. (by hydrolysis) and 0.45 Cl-eq. (by combustion), per kg.

*Example 15*

In the flask fitted with stirring means of the apparatus described in Example 1, 1110 parts (12 mols) of epichlorhydrin are introduced whilst the dropping funnel contains a solution of 136 parts (1 mol) of pentaerythrite in 533 parts of an aqueous caustic soda solution of 30 percent strength. The proportion of hydroxyl equivalent to epichlorhydrin is 1:3. The further procedure is according to the directions given in Example 1 except for adding the solution of pentaerythrite in caustic soda solution dropwise to the epichlorhydrin in the course of 100 minutes. There are obtained 77 parts of a yellow end product which is liquid at room temperature and has a content of 5.42 ep.-eq., 7.58 OH-eq., 1.14 Cl-eq. (by hydrolysis) and 1.41 Cl-eq. (by combustion), per kg.

*Example 16*

(a) In the flask of the apparatus described in Example 4, 62 parts (1 mol) of ethylene glycol and 139 parts (1.5 mols) of epichlorhydrin are heated to about 70° C. The proportion of hydroxyl equivalent to epichlorhydrin is 1:0.75. 60 parts of pulverized sodium hydroxide are then added in 19 portions in the course of 1 hour. As the reaction is exothermal, the temperature of the mixture is maintained at 65-75° C. by external cooling. After adding the last portion of sodium hydroxide, the mixture is stirred for 30 minutes at 70° C., whereupon the contents of the flask cool down to room temperature and chloroform is added. After filtering with suction, the residue is washed with chloroform on the filter. After evaporation on the water-bath under a water jet vacuum and after again filtering with suction, the combined filtrate leave 130 parts of a yellow product behind which is liquid at room temperature and has a content of 2.04 ep.-eq., 6.02 OH-eq., 0.13 Cl-eq. (by hydrolysis) and 0.18 Cl-eq. (by combustion), per kg.

(b) The reaction is carried out according to the directions given in the above Example (a) except for (i) using 122 parts (1 mol) of thiodiglycol instead of ethylene glycol, (ii) 148 parts (1.6 mols) of epichlorhydrin, (iii) 64 parts of pulverized sodium hydroxide being added in 10 portions in the course of 70 minutes, and (iv) after adding the last portion of the sodium hydroxide the mixture being stirred for 90 minutes at 70° C.

The proportion of hydroxyl equivalent to epichlorhydrin is in this case 1:0.8. There are obtained 190 parts of a yellow end product which is liquid at room temperature and has a content of 1.98 ep.-eq., 4.94 OH-eq. and 0.64 Cl-eq. (by combustion), per kg.

*Example 17*

In the flask of the apparatus described in Example 4, 138 parts (1 mol) of 1.3-dimethylolbenzene and 555 parts (6 mols) of epichlorhydrin are heated to 70° C. The proportion of hydroxyl equivalent to epichlorhydrin is 1:3. 80 parts of pulverized sodium hydroxide are then added in 7 portions in the course of 25 minutes. The temperature of the mixture is maintained at 65-75° C. by external cooling. After the addition of the last portion of sodium hydroxide, the mixture is stirred for 75 minutes at 70° C., and after cooling to room temperature the whole is filtered with suction and the residue washed on the filter with epichlorhydrin. After evaporation on the water-bath under a water jet vacuum and after again filtering with suction, the combined filtrates leave 224 parts of a yellow product behind which is liquid at room temperature and has a content of 5.85 ep.-eq., 2.55 OH-eq., 0.04 Cl-eq. (by hydrolysis) and 0.14 Cl-eq. (by combustion), per kg.

*Example 18*

In a flask provided with thermometer, stirrer and filler neck, 62 parts (1 mol) of ethylene glycol are heated to 60° C. In the course of 45 minutes 10 portions of 37 parts (total 4 mols) of epichlorhydrin and 10 portions of 8 parts of pulverized sodium hydroxide are added, a portion of each of the substances being added approximately every 5 minutes and the temperature of the mixture being maintained at 60–80° C. by external cooling. The proportion of hydroxyl equivalent to epichlorhydrin is 1:2. After adding the last portion the mixture is stirred for a further 50 minutes, then cooled to room temperature and filtered. The residue on the filter is washed with epichlorhydrin and the combined filtrates are concentrated on a water bath under a water jet vacuum. After filtering again there are obtained 161 parts of a clear, yellowish colored product which is liquid at room temperature with a content of 5.45 ep.-eq., 2.85 OH-eq., 0.20 Cl-eq. (by hydrolysis) and 0.25 Cl-eq. (by combustion), per kg.

What we claim is:

1. A single-stage process for the manufacture of a product consisting substantially of polyethers containing at least one glycidyl group, which process comprises reacting ethylene glycol with 1 to 5 mols of epichlorhydrin and about 1 mol of a strong alkali per hydroxyl-equivalent of the ethylene glycol, continuously distilling off water and epichlorhydrin from the reaction mixture, separating the distilled products from each other and returning only the epichlorhydrin to the reaction mixture.

2. A process in accordance with claim 1, wherein the reaction is carried out while adding, in the course of the reaction, the strong alkali to a mixture of the epichlorhydrin and the ethylene glycol.

References Cited in the file of this patent

UNITED STATES PATENTS

| | | |
|---|---|---|
| 1,971,662 | Schmidt et al. | Aug. 28, 1934 |
| 2,467,171 | Werner et al. | Apr. 12, 1949 |
| 2,500,600 | Bradley | Mar. 14, 1950 |
| 2,512,996 | Bixler | June 27, 1950 |
| 2,538,072 | Zech | Jan. 16, 1951 |
| 2,555,169 | Voorthuis | May 29, 1951 |
| 2,694,694 | Greenlee | Nov. 16, 1954 |
| 2,698,315 | Greenlee | Dec. 28, 1954 |
| 2,739,160 | Bell | Mar. 20, 1956 |
| 2,758,119 | Bell | Aug. 7, 1956 |

OTHER REFERENCES

Conant: Chem. of Org. Compounds (1947), p. 33.

Degering: Outline of Organic Chemistry (1947), pp. 50, 127, 195, 337, 350. Barnes and Noble, New York City.

Brewster: Org. Chemistry, 2nd edition (1954), pp. 134–135; 606, Prentice-Hall, Inc.

Fieser and Fieser: Org. Chemistry (1944), pp. 130–131.

UNITED STATES PATENT OFFICE
CERTIFICATE OF CORRECTION

August 4, 1959

Patent No. 2,898,349

Paul Zuppinger et al

It is hereby certified that error appears in the printed specification of the above numbered patent requiring correction and that the said Letters Patent should read as corrected below.

Column 1, line 14, for "contining" read -- containing --; line 36, for "2 mol" read -- 1 mol --; column 2, line 18, for "intremediately" read -- intermediately --.

Signed and sealed this 22nd day of December 1959.

(SEAL)
Attest:

KARL H. AXLINE
Attesting Officer

ROBERT C. WATSON
Commissioner of Patent